Patented Mar. 31, 1953

2,633,418

UNITED STATES PATENT OFFICE 2,633,418

HERBICIDAL COMPOSITION AND METHOD OF WEED CONTROL

Lawrence B. Scott, Oakland, Richard R. Whetstone, Orinda, and Johannes Van Overbeek and René Blondeau, Modesto, Calif., assignors to Shell Development Company, San Francisco, Calif., a corporation of Delaware No Drawing. Application July 15, 1950, Serial No. 174,124

10 Claims. (Cl. 71—2.6)

The chemical control of weeds has been investigated by numerous workers during recent years. For the most part, their investigations have been concerned with total weed elimination such as is required on the banks of irrigation canals and the like. For this and similar purposes, chemical agents having a substantially permanent herbicidal effect are preferred, such as pentachlorophenol. More recently, a development in weed control has been considered which is referred to as "pre-emergence weed killing." By this term is meant the elimination of weeds from a planted agricultural area prior to emergence of the desired crop. In this type of weed control, an entirely different set of requirements exist for the agent to be applied to the weeds. In order to prevent damage to the crop when or after it germinates and emerges from the soil, it is necessary that the herbicide perform its weed-killing functions and then be either removed, disposed or converted to a non-phytocidal material. Pre-emergence weed killing is especially valuable in the large-scale cultivation of crops such as sugar beets and vegetables.

At the present time, agents which might be used for pre-emergence weed killing are either partially ineffective, too expensive for industrial applications, or have a detrimental residual effect upon the emerging crop. For example, pentachlorophenol may be applied to weeds in a hydrocarbon solvent, following which the hydrocarbon evaporates leaving a solid deposit of pentachlorophenol. Upon emergence of the crop, the presence of the toxic agent has been found to stunt or even kill the crop and, therefore, can not be used in many instances or must be used under strictly controlled operating conditons.

The application of hydrocarbon oils containing substantial amounts of aromatic hydrocarbons is one method of controlling weed growth. In order for hydrocarbon weed killers to be effective, they must be applied in amounts in excess of about 50 gallons per acre; and in order to ensure a total kill, the aromatic content of the hydrocarbon usually must be over 25%.

It is an object of the present invention to improve methods of crop cultivation. It is another object of the present invention to provide an improved process for weed control. It is a specific object of the present invention to provide a pre-emergence weed-killing composition which deposits no residual toxic substance on or in the soil. It is a further object of the present invention to provide an improved weed-killing composition effective when applied in relatively small amounts. Other objects will become apparent during the following discussion.

Now, in accordance with the present invention, it has been found that the herbicidal effectiveness of aromatic-containing hydrocarbon oils is greatly improved by the addition thereto of cycloaliphatic carboxylic acids of the class as more fully defined hereinafter. In the following discussion, wherever the term "cycloaliphatic acid" is employed, it will be understood that the class of compounds defined more fully hereinafter is being described. The preferred class of materials have the general configuration

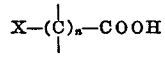

wherein X is a cycloaliphatic nucleus and $n$ is 0 or a positive while number.

Still in accordance with the present invention, it has been found that the combination of cycloaliphatic carboxylic acids with aromatic-containing kerosene or diesel oil fractions, or mixtures thereof, makes possible a new method of pre-emergence weed killing wherein the composition is applied to the weeds prior to emergence of a crop, after which the hydrocarbon oil evaporates, leaving a deposit of the cycloaliphatic acid, which, in the absence of the oil, has been found to be substantially non-toxic to the emerging crop.

The carbocyclic cycloaliphatic acids useful in the compositions and process of the present invention preferably contain from seven to twenty carbon atoms per molecule. It has been found that acids of greater or less carbon content are relatively ineffective for the present purpose. An additional criterion which the acids should possess is a minimum water solubility of 0.0003 gram per 100 grams of water at 20° C. While maximum water solubility does not appear to be limited according to the data available at the present time, this property is more or less limited by a corresponding requirement that the cycloaliphatic acids must be soluble in the aromatic oils described hereinafter. The properties of polarity and hydrocarbon content as defined above should result in an acid having a spreading pressure greater than fifteen dynes per centimeter. Spreading pressure has been defined by Harkins and Livingston, J. Chem. Phys., 10, 342 (1942).

While the broadest concept of the present invention is the use of cycloaliphatic acids having from seven to twenty carbon atoms, it has been found that the most effective acids for the present purpose have from ten to eighteen carbon atoms per molecule. More particularly, especially when petroleum naphtenic acids are employed, optimum results are obtained when the average carbon content of the naphtenic acids is from twelve to sixteen carbon atoms per molecule, corresponding to an acid number of from 28 to 220, respectively which have nearly double the effectiveness of higher and lower molecular weight acids; however, when employing unsaturated cycloaliphatic acids, optimum results appear possible with acids having from ten to fifteen carbon atoms per molecule.

The acids contemplated for use in the present compositions and process may be saturated or unsaturated, may contain one or more cycloaliphatic radicals and are composed of one or more carbocyclic rings as long as the carbon atom content and other requirements, as defined above, are satisfied.

The preferred types of acids for use in the present compositions and process are naphthenic acids and especially those derived from petroleum sources. It has been found that the use of naphthenic acids in aromatic mineral oils (which are defined hereinafter) produces an herbicidal composition having the required characteristics of high herbicidal activity while the composition remains intact and substantially no phytocidal activity on plants after their emergence and after the oil has evaporated. Naphthenic acids, especially when used in the small amounts required, are relatively harmless for all forms of established plant life in the absence of the hydrocarbon oil, but have been found to improve the herbicidal character of aromatic-containing hydrocarbon oils to a remarkable degree. This effect appears to increase with increasing acid content of the composition, at least up to 25% naphthenic acid content.

Naphthenic acids are mixtures derived principally from petroleum sources and consist of a family of compounds which are found in and may be separated from the different petroleum fractions, the lighter naphthenic acids having a higher acid number being present in the lighter petroleum fractions. It has been found that the high acid number naphthenic acids are especially useful in the described compositions. Acid numbers between about 125 and 300 are preferred, while the acids having an acid number of 200 to 250 give optimum herbicidal effects when employed together with the hydrocarbon oils described hereinafter. The presence of the naphthenic acids and, in fact, of the other carbocyclic acids described more fully hereinafter, in the particular type of aromatic hydrocarbon oils, also hereinafter described, appears to enable the oil to penetrate the stomata of the leaves or the surfaces of tightly rolled leaves or grasses to a much greater extent than if the acids are not present in the hydrocarbon composition. Penetration of the stomata appears to be essential for the phytotoxicity of a hydrocarbon oil to be fully utilized.

The following list of specific cycloaliphatic acids illustrates the scope of the invention in its most preferred aspects. It will be understood that the species hereinafter enumerated are merely typical of the classes which may be employed and that in view thereof, they should only be considered as limiting the scope of the invention within the general requirements and limitations set forth hereinbefore.

1. Naphthenic acids as defined above.
2. Cycloaliphatic carboxylic acids:
   (a) Gamma-cyclohexanealkanoic acids—
      Cyclohexanebutyric acid
      Cyclohexanevaleric acid
      Cyclohexanecaproic acid
   (b) Alkylcyclohexanoic acids—
      p-Tert-butylcyclohexanoic acid
      m-Sec-amylcyclohexanoic acid
      o-n-Octylcyclohexanoic acid
      m-Isopropylcyclohexanoic acid
      m-Isopropyl-o - tert - butylcyclohexanehexanoic acid
3. Halogenated cyclohexanoic acids:
   2-iodo-4-methylcyclohexanoic acid
   3-chloro-5-isopropylcyclohexanoic acid
   2,4,6-trichloro-3-tert-butylcyclohexanoic acid
   3,5,6-trichloro-2-isooctylcyclohexanoic acid
   4-chloro-5-isoamylcyclohexanoic acid
4. Polycyclic carboxylic acids:
   Rosin acids
   Abietic acid The oils to be used in the present herbicidal compositions should contain at least 10% by weight of aromatic hydrocarbons expressed as "100% unsulfonatable residues." Preferably, the aromatic content is between 10% and 50% by weight, and optimum results are obtained if the oil contains between 10% and 25% aromatics.

The boiling range of the aromatic oil will depend upon the specific application conditions, such as temperature and rate at which the oil must evaporate. Under most agricultural conditions, it will be found that oils boiling in the kerosene and diesel oil range will be satisfactory; hence, initial boiling points of about 275° F. and final boiling points of about 550° F. or slightly higher are required. A preferred oil is one having a boiling range of less than about 100° F., preferably having an initial boiling point of 300° F. and a final boiling point of 400° F. Optimum results are obtained when the oil boils between about 315° F. and 390° F. Oils falling within these requirements generally have a viscosity of less than 30 and preferably between 10 and 25 seconds Saybolt Universal at 100° F. A typical aromatic oil useful where normal agricultural temperatures are encountered has the following properties:

| | | |
|---|---|---|
| I. B. P. | ° F. | 320 |
| F. B. P. | ° F. | 384 |
| $n20/D$ | | 1.4490 |
| $d20/D$ | | 0.8054 |
| Aromatics | percent (wt.) | 12.6 |
| Naphthenics | do | 38.0 |
| Olefins | percent | 0.0 |
| Paraffins | percent (wt.) | 49.4 |
| Carbon | do | 86.64 |
| Hydrogen | do | 13.49 |
| Sulfur | do | 0.01 |
| Nitrogen | do | 0.06 |

The compositions comprising the cycloaliphatic acids and aromatic oil contain a substantial amount of the acid in the most concentrated form of the invention, and in the most dilute effective compositions about 0.25% by weight of the acid is present. It will be realized that compositions of this character may be marketed as concentrates containing from 10% to 60% by weight of the acid and preferably between 40% and 55% by weight of the acid. When used for field application, however, such concentrates should be diluted with additional amounts of the aromatic oil to give compositions having at least 0.25% acid and preferably 0.5% acid minimum. The effective field application, depending upon the exact conditions encountered, may require concentrations up to 5% by weight of the acid, and optimum concentrations are between 1% and 2.5% of the acid.

While the compositions may be sprayed in the form of the unmodified solution, alternative means of application comprise application to weeds in the form of an emulsion. The acids comprising the essential improving agent in this invention act as temporary emulsifying agents so that in many instances the use of additional emulsifiers or emulsion stabilizers is unnecessary. However, if more stable emulsions are required, any of the well-known emulsifying agents may be employed. Typical of these are sorbitan monolaurate, sorbitan monooleate, sodium alkyl aryl sulfonate, sodium aryl sulfonate, alkylated kerosene sulfonic acids, quaternary ammonium compounds and higher molecular weight amines, such as octadecylamine and heptadecenyl hydroxyethyl glyoxalidine.

While the compositions, as defined hereinbefore, provide maximum weed control, other agents may be added to the compositions to extend their effectiveness or to synergize therewith. These include agents such as sodium trichoroacetate, isopropylphenyl carbamate and maleic hydrazide. One modification of the compositions comprises the addition thereto of between ½% to 3% by weight of inorganic gelling agents such as silicate, alumina, magnesia, synthetic zeolites and oleophilic clay-like materials. The clays useful in the present compositions include the reaction products of high molecular weight quaternary ammonium salts and montmorillonites such as calcium or magnesium montmorillonites. Preferred gelling agents are those which are substantially neutral such as silica. The agents are to be used in sufficient amount to provide a thixotropic composition which sprays easily but thickens to a limited degree when deposited on the weed, thus providing a maximum opportunity for penetration of the weed surface by the oil and acid.

The process of the present invention comprises the steps of spraying an area which has been planted with crop seeds but from which weed plants have already emerged with the acid and aromatic hydrocarbon compositions defined above. The spraying is conducted at such a time and under such conditions that the hydrocarbon oil vaporizes to a large extent before the crop germinates and emerges from the ground or at least before stomata development in the emerging crop leaves.

Preferably, application of the compositions defined should be made on hot, humid days and in full sunlight. The latter preferred conditions are those under which the stomata are diluted to the maximum extent. As opposed to this, the worst type of conditions would comprise application on cold, dry, overcast days or during the late afternoon or evening.

Dependent upon the agent and size of the weeds and other conditions, the above compositions should be applied in amounts ranging from about 15 to 50 gallons per acre, while effective weed control is generally gained by the use of 20-35 gallons per acre. It will be realized that smaller amounts of the compositions may be used if aqueous emulsions are employed but that in such a case, increased amounts of acids may be required. Preferably, application of the composition is made to the weeds when they are small, since large weed plants require a correspondingly greater amount of herbicidal compositions for effective coverage. The following example illustrates the effectiveness of the present compositions.

Example

A kerosene having a low aromatic content was sprayed on plants to determine its phytocidal activity. It was found that while the oil injured the leaves to a limited extent, no major toxic effect was exhibited. When the acids listed below were dissolved in the same oil and applied to plants as a aersol spray in concentrations similar to those used in field application, highly toxic and lethal results were obtained. The following table illustrates the results obtained in these experiments.

| Cycloaliphatic Acid | Minimum Toxic Concentration, Percent | Minimum Lethal Concentration, Percent |
|---|---|---|
| Stove oil naphthenic acids, acid No. 252 (14 carbon atoms average) | 0.25 | 1 |
| Naphthenic acids, acid No. 202 (18 carbon atoms average) | 1 | 2 |
| Monochlorocyclohexane carboxylic acid | 1 | |

The invention claimed is:

1. A composition comprising 90-40% of a petroleum hydrocarbon fraction boiling between 315° F. and 390° F. and having an aromatic content between 10% and 25% by weight of the oil, and 10-60% by weight of said composition of petroleum naphthenic acids having an average of between 14 and 18 carbon atoms per molecule and an acid number between 200 and 250.

2. A composition of matter comprising 90-40% of a hydrocarbon oil having at least a 10% and less than 50% aromatic content, said oil boiling within the range from about 275° F. to about 550° F. and 10-60% by weight of said composition of a cycloaliphatic polycyclic carboxylic acid soluble in said oil at 20° C., and having between 7 and 20 carbon atoms per molecule, said acid having a water solubility at 20° C. of at least 0.0003 gram per 100 grams of water.

3. A composition comprising 90-40% of a hydrocarbon oil boiling between 300° F. and 400° F. and having at least a 10% and less than 50% aromatic content and 10-60% by weight of said composition of petroleum naphthenic acids, said naphthenic acid being soluble in the oil and having an acid number between 125 and 300.

4. A composition of matter comprising 90-40% of a hydrocarbon oil having at least a 10% and less than 50% aromatic content, said oil boiling within the range of from about 275° F. to about 550° F. and 10-60% by weight of said composition of a naphthenic acid soluble in said oil at 20° C., and having an average of between 7 and 20 carbon atoms per molecule, said acid having a water solubility at 20° C. of at least 0.0003 gram per 100 grams of water.

5. A composition of matter comprising 90-40% of a hydrocarbon oil having at least a 10% and less than 50% aromatic content, said oil boiling within the range of from about 275° F. to about 550° F. and 10-60% by weight of said composition of a cyclohexanealkanoic acid soluble in said oil at 20 C., and having between 7 and 20 carbon atoms per molecule, said acid having a water solubility at 20° C. of at least 0.0003 gram per 100 grams of water.

6. A composition of matter comprising 90-40% of a hydrocarbon oil having at least a 10% and less than 50% aromatic content, said oil boiling within the range of from about 275° F. to about 550° F. and 10-60% by weight of said composition of a cycloaliphatic carboxylic acid soluble in said oil at 20° C., and having between 7 and 20 carbon atoms per molecule, said acid having a water solubility at 20° C. of at least 0.0003 gram per 100 grams of water.

7. A composition according to claim 6 wherein the acid is cyclohexanecaproic.

8. A composition according to claim 6 wherein the acid is a rosin acid.

9. A composition of matter comprising 90-40% of a hydrocarbon oil having at least a 10% and less than 50% aromatic content, said oil boiling within the range of from about 300° F. to about 400° F. and 10-60% by weight of said composition of a cyclohexane alkanoic acid having from 10 to 18 carbon atoms per molecule.

10. A composition of matter comprising 90-40% of a hydrocarbon oil having at least a 10% and less than 50% aromatic content, said oil boiling within the range of from about 275° F. to about 550° F. and 10-60% by weight of said composition of a naphthenic acid, said acid being soluble in the oil and having an acid number between 125 and 300.

LAWRENCE B. SCOTT.
RICHARD R. WHETSTONE.
JOHANNES VAN OVERBEEK.
RENÉ BLONDEAU.

REFERENCES CITED

The following references are of record in the file of this patent:

FOREIGN PATENTS

| Number | Country | Date |
| --- | --- | --- |
| 7,927 of 1932 | Australia | June 22, 1932 |

OTHER REFERENCES

"The Science of Petroleum," Dunstan et al. vol. IV (1938), page 2464.

"The Condensed Chemical Dictionary," Reinhold Pub. Co., 3rd ed. (1942), page 650.

California Dept. Agr. Bull., vol. 35, No. 1 (Jan.-Mar. 1946), pages 49-54.

N. Y. State College of Agr. Bull., v. 33 (Rev. Feb. 1948), 5 pages.

Sachanen: "Chemical Constituents of Petroleum," Reinhold Pub. Co., New York, N. Y. (1945), page 321.